(12) United States Patent
Tsai et al.

(10) Patent No.: US 7,881,592 B2
(45) Date of Patent: Feb. 1, 2011

(54) DIGITAL AUDIO/VIDEO PLAYBACK SYSTEM CAPABLE OF CONTROLLING AUDIO AND VIDEO PLAYBACK SPEED

(75) Inventors: Hsi-jung Tsai, Hsinchu (TW);
Chung-hao Tseng, Hsinchu (TW);
Tzu-chuan Huang, Hsinchu (TW);
Hao-huan Shih, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1181 days.

(21) Appl. No.: 11/517,758

(22) Filed: Sep. 8, 2006

(65) Prior Publication Data
US 2007/0098369 A1 May 3, 2007

(30) Foreign Application Priority Data
Oct. 28, 2005 (TW) .............................. 94137801 A

(51) Int. Cl.
*H04N 5/783* (2006.01)
(52) U.S. Cl. ..................... 386/343; 386/353; 704/205
(58) Field of Classification Search .................. 386/46, 386/68–70, 343–348; 704/207, 265, 500, 704/205, 206; 370/389; 348/385.1
See application file for complete search history.

(56) References Cited

U.S. PATENT DOCUMENTS

| | | | | |
|---|---|---|---|---|
| 5,572,377 | A | * | 11/1996 | Ueno ........................... 360/31 |
| 6,360,198 | B1 | * | 3/2002 | Imai et al. ................... 704/207 |
| 2006/0251064 | A1 | * | 11/2006 | Yeh et al. .................... 370/389 |

* cited by examiner

*Primary Examiner*—Thai Tran
*Assistant Examiner*—Mishawn Dunn
(74) *Attorney, Agent, or Firm*—Jianq Chyun IP Office

(57) ABSTRACT

A digital audio/video playback system capable of controlling audio and video playback speed for decoding a digital audio/video signal and then outputting such signal. The system includes: a loader configured to receive the digital audio/video signals, a parser configured to resolve the digital audio/video signals into a video bitstream and an audio bitstream, a video decoder and an audio decoder respectively configured to receive and decode the video bitstream and the audio bitstream, and a playback speed controller configured to adjust the sound frequency of the decoded audio based on a set playback speed and output the decoded video/audio at the set playback speed.

7 Claims, 3 Drawing Sheets

DIGITAL AUDIO/VIDEO PLAYBACK SYSTEM CAPABLE OF CONTROLLING AUDIO AND VIDEO PLAYBACK SPEED

BACKGROUND OF THE INVENTION a) Field of the Invention

The invention relates to a digital audio/video playback system and, more particularly, to a digital audio/video playback system capable of controlling audio and video playback speed.

b) Description of the Related Art

Advancement in information technology has enabled sounds and images to be stored, transmitted, and played back in digital format. Besides providing higher definition films, digital audio/video format further provides many additional functions. Taking digital versatile disc (DVD) as an example, it not only stores high definition films but also collects multilingual soundtracks and multiple sub-pictures for users to select for playback. One of the main functions of the sub-picture is to be used as subtitle. For example, since English and Chinese soundtracks as well as English and Chinese subtitles are collected in an English language family film, an user can select to playback the film in English with Chinese subtitle, in English with English subtitle, or in Chinese with either English or Chinese subtitle. Thus, the film can be internationalized more easily.

Referring to FIG. 1, a conventional digital audio/video playback system 1 includes a loader 11, a parser 12, a video decoder 13, and an audio decoder 14. The loader 11 is used to receive a digital audio/video signal (DAVS). The parser 12 is used to resolve the DAVS into a video bitstream (VB) and an audio bitstream (AB). The video decoder 13 receives the VBS and decodes it to a decoded video (DV), whereas the audio decoder 14 receives the ABS and decodes it to a decoded audio (DA). The DV and DA are then output to an output device 2.

The aforementioned DVD with multiple soundtracks and subtitle tracks collected therein can be played back with its sound and subtitle in different languages, and therefore the DVD can serve a language learning purpose according to the user's need. For example, when a movie is played back in English with English subtitle, the image, sound and subtitle information can be simultaneously received at the user's end to enhance the learning effect. However, the conventional DVD playback system only plays back video (including picture and subtitle) and audio simultaneously at a normal playback speed. If a movie is played back at a slower playback speed, mostly only video is in slow motion but no audio is output, resulting in a silence status or a seriously distorted output audio like lowered tone, mumbled or intermittent sound. Thus, the effect of language learning is greatly affected since the user is unable to simultaneously receive accurate and clear video and audio. On the other hand, if the movie is played back at a higher playback speed, also only video is output but not audio, or the output audio is distorted, for example, too high and sharp tone that is difficult to be recognized.

Summing up the above, there is a need to create a digital audio/video playback system capable of adjusting the audio/video playback speed while outputting video and audio with minimized distortion of output audio.

BRIEF SUMMARY OF THE INVENTION

In view of the aforementioned problems, it is an object of the invention to provide a digital audio/video playback system capable of controlling audio/video playback speed, in which the video and the audio are output simultaneously, the audio is fluently played back and its distortion is minimized.

In order to achieve the aforementioned object, a digital audio/video playback system capable of controlling audio/video playback speed in the invention is configured to decode a digital audio/video signal and output such signal through an output device. The digital audio/video playback system includes a loader, a parser, a video decoder, an audio decoder, and a playback speed controller. The loader is used for receiving the digital audio/video signal. The parser is signal-connected to the loader and is used for resolving the digital audio/video signal into a video bitstream and an audio bitstream. The video decoder is signal-connected to the parser and is used for decoding the video bitstream to a decoded video. The audio decoder is signal-connected to the parser and is used for decoding the audio bitstream to a decoded audio. The playback speed controller is signal-connected to the video decoder and the audio decoder and is used for adjusting the sound frequency of the decoded audio based on a set playback speed and outputting the decoded video and decoded audio at the set playback speed to the output device for playback.

The digital audio/video playback system capable of controlling audio/video playback speed according to the invention adjusts the frequency of the audio, when the set playback speed is different from a normal playback speed, such that the output audio has an unchanged tone, minimized distortion, and can be continuously output together with the video at a set playback speed.

DETAILED DESCRIPTION OF THE INVENTION

Figure 1:
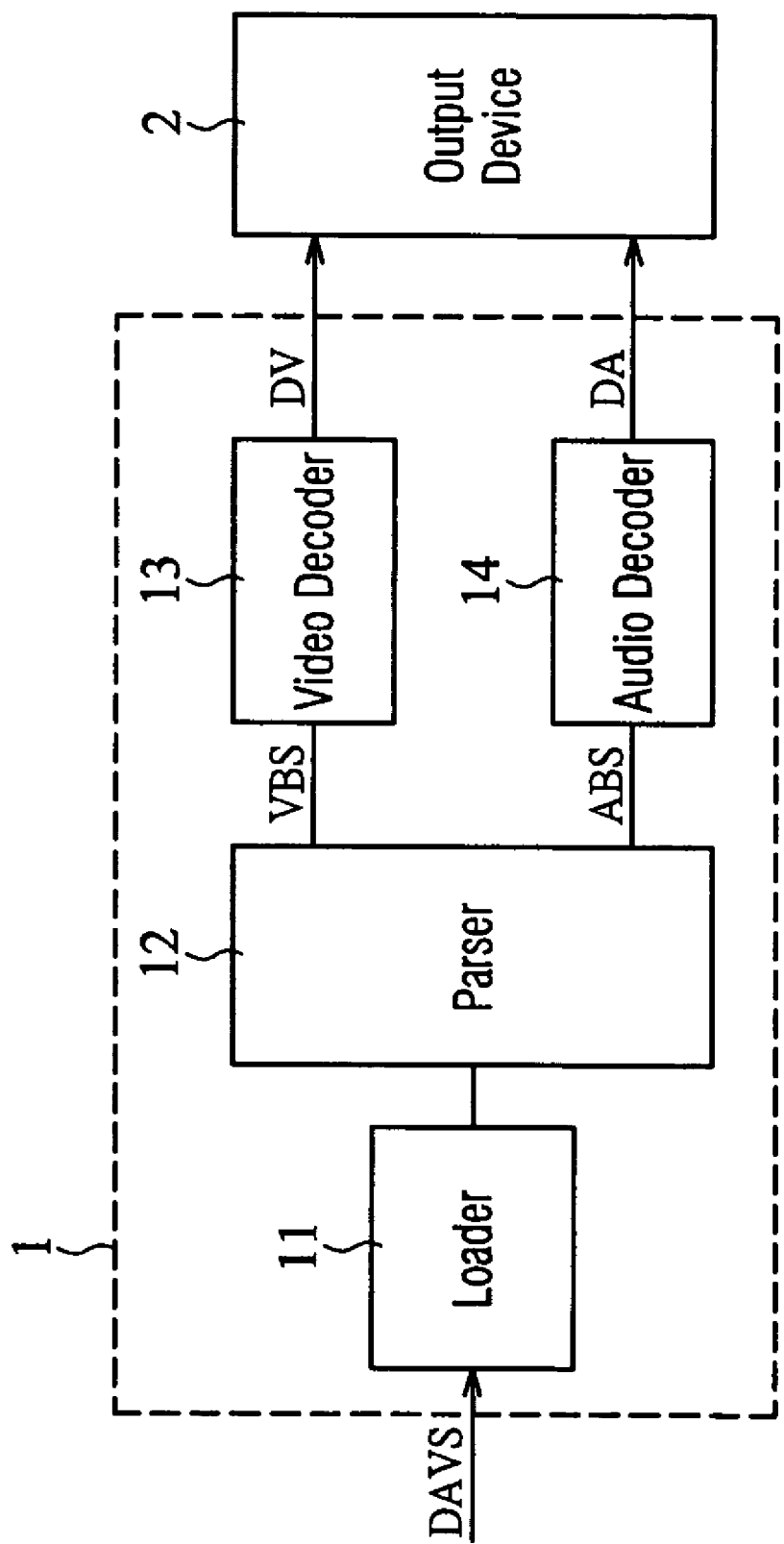
FIG. 1 is a block diagram illustrating a conventional digital audio/video playback system.

The digital audio/video playback system capable of controlling audio and video playback speed according to preferred embodiments of the invention will be described below with reference to the drawings, wherein the like reference numerals denote the like components.

Figure 2:
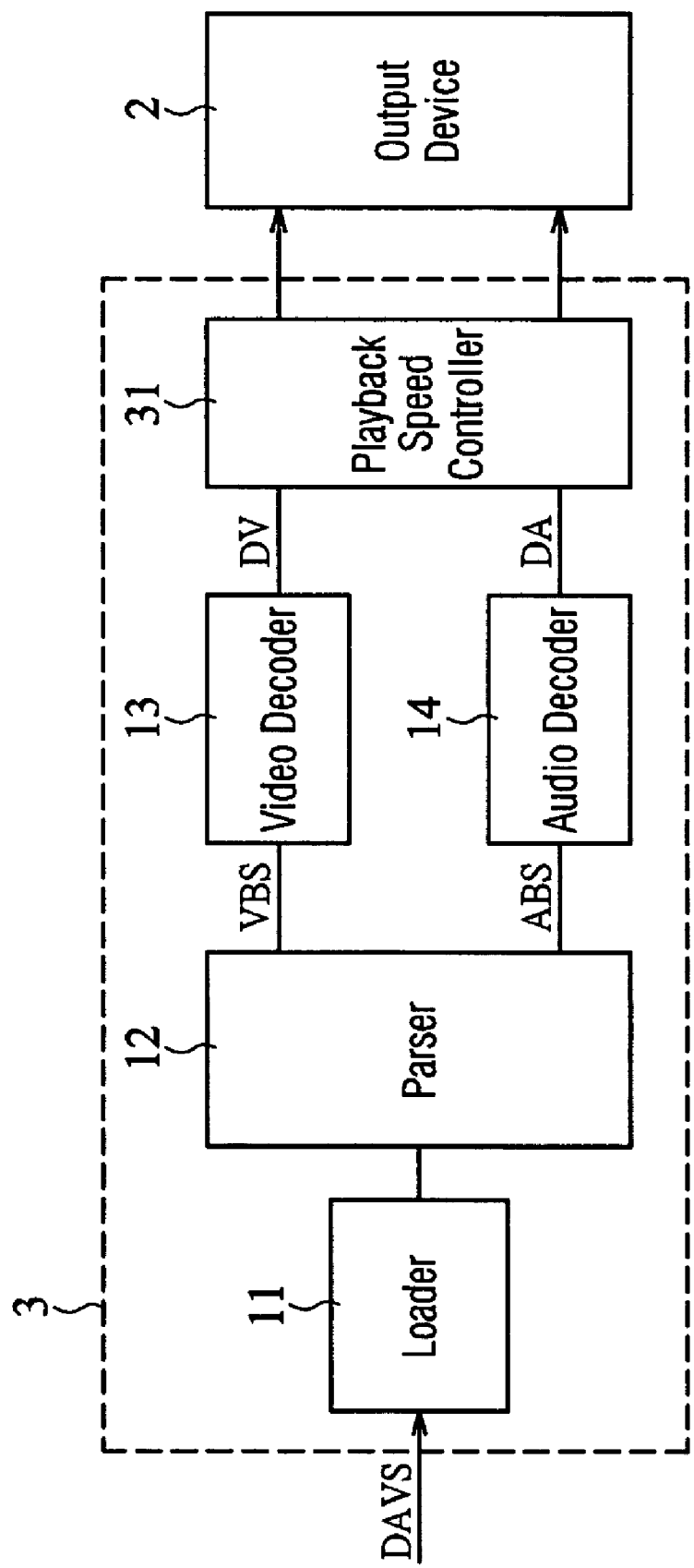
FIG. 2 is a block diagram illustrating a digital audio/video playback system capable of controlling audio/video playback speed according to a preferred embodiment of the invention.

Referring to FIG. 2, a digital audio/video playback system 3 capable of controlling audio and video playback speed according to a preferred embodiment of the invention is configured to decode a digital audio/video signal (DAVS) and output such signal through an output device 2. The digital audio/video playback system 3 includes a loader 11, a parser 12, a video decoder 13, an audio decoder 14, and a playback speed controller 31.

The loader 11 is configured to receive a DAVS. Take DVD playback as an example, the loader 11 would include elements like digital signal reading unit, signal processing unit, and more, which can load DAVS from a storage medium like a DVD optical disc or a hard disc. Take digital video broadcasting (DVB) playback as another example, the loader 11 would include elements like antenna, demodulator, demutiplexor, signal processing unit, and more. Therefore, the loader 11 can be implemented with different designs by a person skilled in the art according to different needs, and is thereby not further described herein.

The parser 12 is signal-connected to the loader 11 and is configured to resolve the DAVS into a video bitstream (VBS) and an audio bitstream (AVS). The video decoder 13 is signal-connected to the parser 12. The video decoder 13 receives the VBS and decodes it to a decoded video (DV); the video decoder 13 can be, for example, a Movie Picture Experts Group (MPEG) video decoder. The audio decoder 14 is also signal-connected to the parser 12. The audio decoder 14 receives the ABS and decodes it to a decoded audio (DA); the audio decoder 14 can be an audio decoder of any audio format, for example, a MPEG, an Audio Codec 3 (AC3), or a Pulse Code Modulation (PCM) audio decoder.

Figure 3:
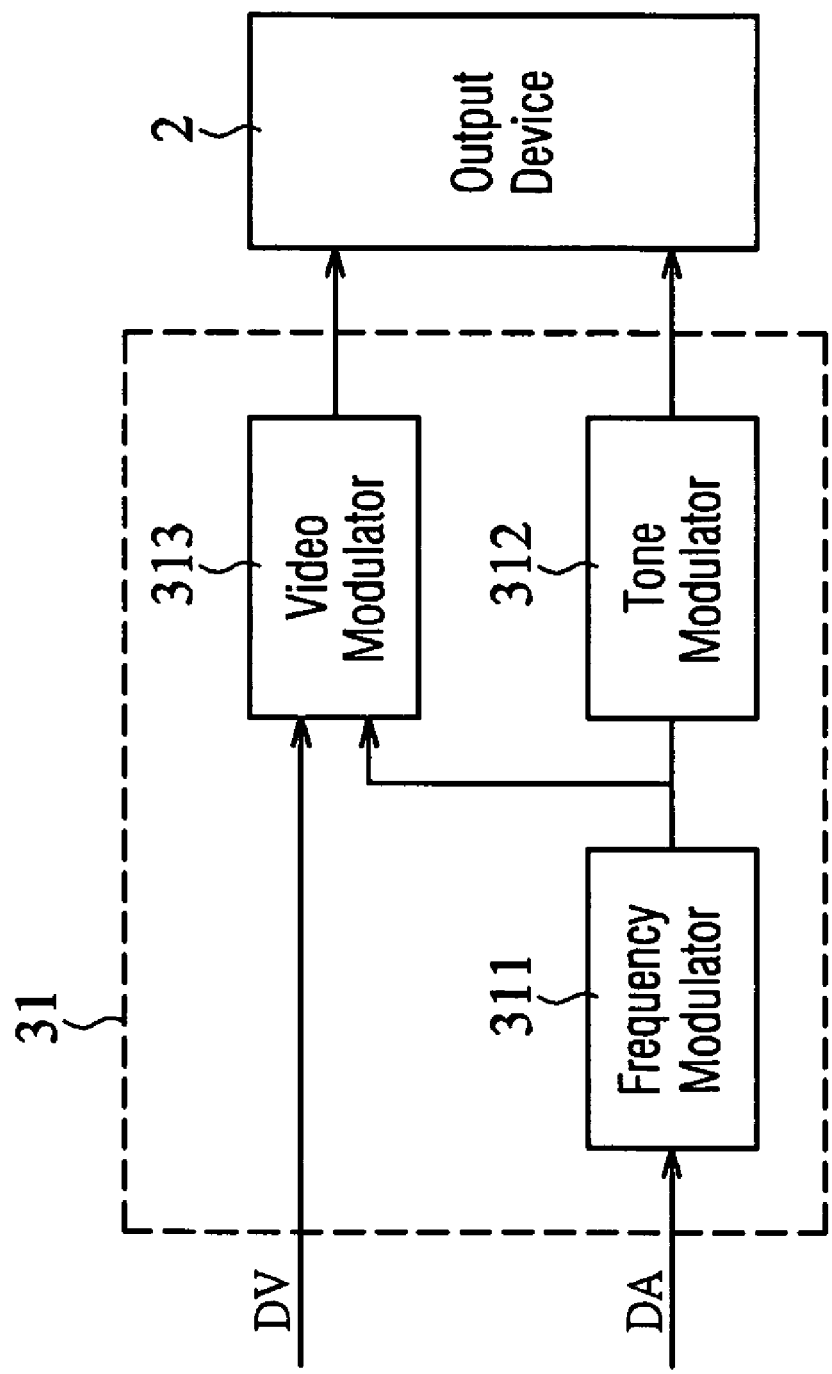
FIG. 3 is a block diagram illustrating a playback speed controller of the invention.

The playback speed controller 31 is signal-connected to the video decoder 13 and the audio decoder 14. The playback speed controller 31 adjusts the sound frequency of the DA based on a set playback speed, and outputs the DV and DA to the output device 2 at the set playback speed for playback. Referring to FIG. 3, the playback speed controller 31 includes a frequency modulator 311, a tone modulator 312, and a video modulator 313. The frequency modulator 311 receives the DA and changes the DA playback speed by adjusting the sampling frequency. The tone modulator 312 is configured to adjust the tone of DA, so that the output tone of DA at any playback speed remains the same or has minimized distortion. The video modulator 313 is configured to adjust the playback speed of video, so that it is the same as the playback speed of audio. Last, the DV and DA are output through the output device 2.

The playback speed controller 31 can playback the DV at a normal playback speed, and so the DA is output at the normal playback speed as well. However, when the DV and DA are played back at a playback speed slower than the normal playback speed, the DA is required to raise the sound frequency before it is output. By that the tone output at the slower playback speed is the same as the tone output at the normal playback speed or has minimized distortion, and at the same time, the audio output at the slower playback speed is output in fluent continuity. In contrast, when the DV and DA are played back at a playback speed faster than the normal playback speed, the DA is required to lower its sound frequency before it is output. By that the tone output at the faster playback speed is the same as the tone output at the normal playback speed or has minimized distortion, and at the same time, the audio is output in fluent continuity.

According to the digital audio/video playback system capable of controlling audio and video playback speed of the invention, the audio frequency is adjusted when the set playback speed is different from the normal playback speed so that the tone of the output audio remains the same or has minimized distortion. Furthermore, the output audio can be output continuously with the video simultaneously at the set playback speed. Therefore, the digital audio/video playback system of the invention is conducive to language learning when it is played back at low-speed and facilitate users' fast search when it is played back at high-speed.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. For example, the output device 2 and the digital audio/video playback system can be integrated together as a whole. Therefore, the scope of the appended claims should be accorded the broadest interpretation so as to encompass all such modifications and similar arrangements.

What is claimed is:

1. A digital audio/video playback system capable of controlling audio and video playback speed for decoding a digital audio/video signal and outputting the signal through an output device, the digital audio/video playback system comprising:
   a loader for receiving the digital audio/video signal;
   a parser for resolving the digital audio/video signal into a video bitstream and an audio bitstream, the parser being signal-connected to the loader;
   a video decoder for receiving the video bitstream and decoding the video bitstream to a decoded video, the video decoder being signal-connected to the parser;
   an audio decoder for receiving the audio bitstream and decoding the audio bitstream to a decoded audio, the audio decoder being signal-connected to the parser; and
   a playback speed controller for adjusting the sound frequency of the decoded audio based on a set playback speed and outputting the decoded audio and the decoded video at the set playback speed to the output device, the playback speed controller being signal-connected to the video decoder and the audio decoder,
   wherein the set playback speed is faster, slower, or equal to a normal playback speed; when the set playback speed is slower than the normal playback speed, the playback speed controller raises the sound frequency of the decoded audio to minimize the distortion of the output tone of the set playback speed with respect to the output tone of the normal playback speed; and when the set playback speed is faster than the normal playback speed, the playback speed controller lowers the sound frequency of the decoded audio to minimize the distortion of the output tone of the set playback speed with respect to the output tone of the normal playback speed.

2. The digital audio/video playback system capable of controlling audio and video playback speed as described in claim 1, wherein the playback speed controller further comprises: a frequency modulator for receiving the decoded audio and, adjusting the sampling frequency of the decoded audio based on the set playback speed; a tone modulator for adjusting the tone of the decoded audio to minimize the tone distortion when output at the set playback speed; and a video modulator for adjusting the playback speed of video based on the set playback speed.

3. The digital audio/video playback system capable of controlling audio and video playback speed as described in claim 1, wherein the video decoder is a MPEG video decoder.

4. The digital audio/video playback system capable of controlling audio and video playback speed as described in claim 1, wherein the audio decoder is a MPEG audio decoder, an AC3 audio decoder, or a PCM audio decoder.

5. The digital audio/video playback system capable of controlling audio and video playback speed as described in claim 1, wherein the output device and the digital audio/video playback system are integrated.

6. The digital audio/video playback system capable of controlling audio and video playback speed as described in claim 1, wherein the digital audio/video playback system is a DVD playback system.

7. The digital audio/video playback system capable of controlling audio and video playing speed as described in claim 1, wherein the digital audio/video playback system is a digital video broadcasting playback system.

* * * * *